Dec. 14, 1926.

K. E. PEILER 1,611,063

TIMING MECHANISM FOR GLASS FEEDERS

Original Filed July 17, 1920    2 Sheets-Sheet 1

Inventor:
Karl E. Peiler
by Robson & Brown
Atty.

Dec. 14, 1926. 1,611,063
K. E. PEILER
TIMING MECHANISM FOR GLASS FEEDERS
Original Filed July 17, 1920    2 Sheets-Sheet 2

Inventor:
Karl E. Peiler
by Robert S. Brown
Atty.

Patented Dec. 14, 1926.

1,611,063

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

TIMING MECHANISM FOR GLASS FEEDERS.

Original application filed July 17, 1920, Serial No. 396,934. Divided and this application filed December 30, 1925. Serial No. 78,424.

My invention relates to mechanism for timing the operation of feeders for molten glass or the like, or of apparatus operatively associated with a feeder for molten glass. It is intended more particularly as a timer for use in controlling the operation of pneumatically-operated glass feeding apparatus, but such timing apparatus may also be utilized to control the sequence of operations of various other mechanisms associated with a glass feeder or having timing requirements similar to those of glass feeders.

One object of my invention is to provide an improved timer for opening and closing, in proper sequence, the valves which control the operation of pneumatically actuated glass feeders or of apparatus associated therewith, and to provide means for changing at will the time when any of the valves is opened or closed.

More specifically, an object of my invention is to provide a timer of the kind indicated above, wherein changes in the time at which the valves are opened and closed may be made while the apparatus is in operation.

Glass feeders for delivering mold charges of molten glass ordinarily perform several operations which occur in timed sequence during the delivery of each mold charge to discharge and sever the glass. It is highly desirable that the operator be able to change the times at which these several operations take place, preferably without stopping the feeder, so that he may produce mold charges of the desired size and shape, and keep them uniform after the desired size and shape are produced. The several operations of glass feeders are frequently produced by fluid pressure, controlled by suitable valves. The times at which each valve is opened and closed determine the time of occurrence of the operation controlled by that valve.

In applying my present invention to such a fluid-pressure operated glass feeder, I provide a timer composed of a series of rotary valve-actuators, preferably aligned axially with one another and rotated in unison. Two of these actuators, rotating in different planes, are preferably provided for each valve, one for opening the valve and the other for closing it, and I prefer to provide the timer with means for independently adjusting the angular positions of all the valve-actuators, so as to advance or retard at will the time at which each valve opens and the time at which each valve closes.

The embodiment of my invention shown and described herein, and in my copending application for Letters Patent filed July 17, 1920, Serial No. 396,934, of which the present application is a division, includes a shaft or other rotary axial support carrying loosely a plurality of axially aligned rotary cams. The driving mechanism for each of these cams includes a gear mounted on or formed integral with the cam, and a gear rigidly mounted on the supporting shaft, and these two gears are connected in driving relation by an adjustably mounted intermediate gear. The arrangement is such that all the cams are driven by the shaft through similar driving mechanism, and thus they are rotated in unison and in the same direction. The time at which each cam functions in its cycle of operation may be changed by advancing or retarding the rotation of the cam gear relative to its driving gear. Each individual cam may be thus adjusted while the cam is rotating, by manually changing the angular position of its intermediate gear relative to its driving gear, and thereby changing the angular relation of the cam gear relative to the supporting shaft.

The independently adjustable cams act through their associated valves to apply and release, in any desired sequence, the various pressures required by the glass feeder or other mechanism to which the timer is applied. Also, the duration of any of these pressures may be adjusted by changing the cams to vary the opening and closing time of each valve. The ability to make all of these adjustments during the continuous operation of the machine is an advantage, on account of the well-known characteristics of glass feeding machines by which any interruption in operation causes a change in working conditions. The operator may, in the present instance, observe instantly the effect of any such adjustment, so that the adjusting movement may be continued progressively until the desired result has been obtained.

Figure 1:
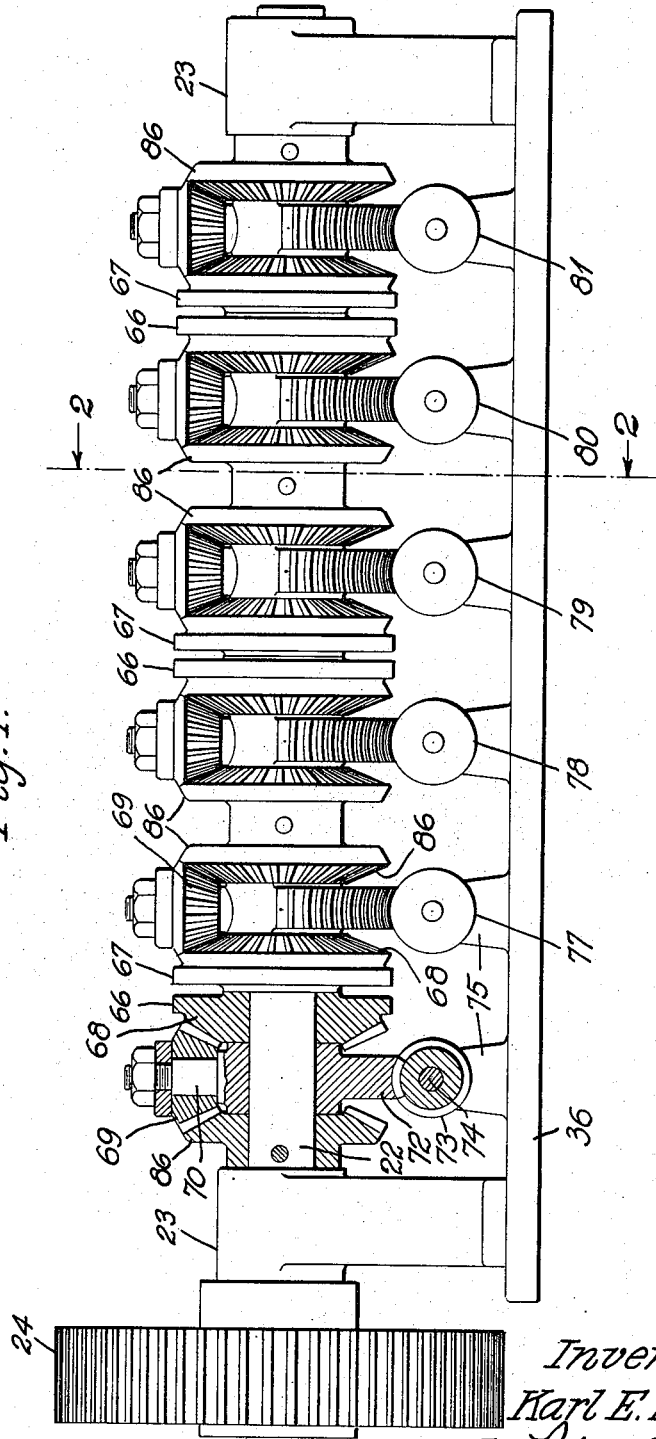
Figure 1 is a front elevation, partially in section, of a timing mechanism constructed in accordance with my invention.
Figure 3:
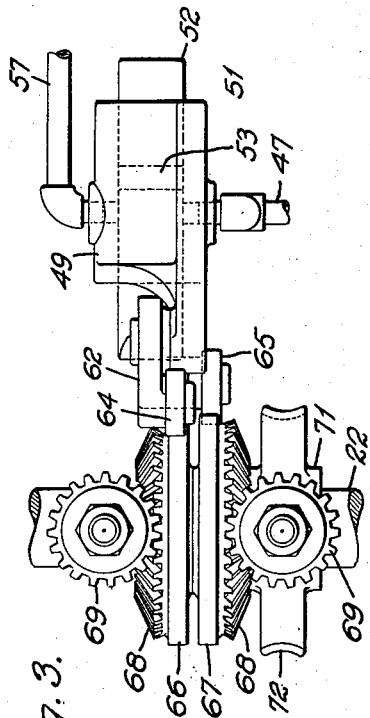
Fig. 3 is a plan view of parts illustrated in Fig. 2.

Referring to the drawings, there is shown in Fig. 1 the general arrangement of a rotary timing mechanism constructed in accordance with my invention, in which a shaft 22 forms an axial support for a plurality of actuator disks or cams 66 and 67 which are mounted loosely upon the shaft 22, and which actuate a set of fluid-pressure valves 49 controlling the application and release of various pressures. The shaft 22 is mounted in bearings 23, 23 provided in a suitable frame 36, and is rotated from any convenient source of power, indicated by the gear 24.

In order that the time of occurrence and duration of any pressure may be freely adjustable, each valve is actuated by two separate and relatively adjustable cams, one to open the valve and the other to close it. These cams are all adjustably mounted on the shaft 22, which, in the feeder of my original application, actuates the glass severing mechanism, so that a variable timed relation is always maintained with relation to the severing operation, and the times of opening or of closing any valve may be freely adjusted, independently of each other and of the other valves.

As stated above, the cams 66 and 67 are loosely mounted on and indirectly driven by the shaft 22, but in order that the time of operation of each cam may be independently advanced or retarded there is a geared driving connection between the shaft and each cam which is capable of adjustment to vary the timing of the cams. Each cam is provided with an integral bevel gear 68 in mesh with a bevel pinion 69 freely rotatable on a stud 70 formed on a collar 71 also loosely mounted on the shaft 22. The collar 71 is held in adjusted position by a segmental gear 72 formed integral therewith, which engages a worm 73 fixed on a shaft 74 mounted in bearings 75 projecting from the table 36. In the illustrated embodiment of the invention, there are six of these cams to be adjusted, and therefore, the six shafts 74 are provided with hand wheels 76, 77, 78, 79, 80 and 81, respectively (Fig. 1) by which the angular position of the several pinions 69 may be independently adjusted. Each pinion 69 is driven by a bevel gear 86, fixed on the shaft 22. As a matter of convenience, two of bevel gears 86, when adjacent, are made in a single casting as shown in Fig. 1, so as to drive adjacent cams. By this construction each cam gear 68 will be driven by a gear 86, but in the opposite direction therefrom, and the timing of each cam may be varied by turning its hand wheel. All of the cams therefore move in unison and in the same direction. In this construction, the cam gears are placed adjacent to each other between the respective fixed gears on the shaft, and thus the loose cam gears are readily maintained in definite time-relation to the apparatus to be actuated.

The cams may be arranged on the shaft in any desired order to properly actuate mechanisms placed adjacent thereto. In the illustrated embodiment of the invention, the cams included in the timer are arranged along the shaft in a series of pairs, and each pair is adapted to open and close a single fluid-pressure valve having movable elements conveniently located in the respective paths of movement of the cams.

The valve 49 is actuated by a pivoted lever 62 mounted on a suitable bracket 51 and provided with two offset rolls 64 and 65 which are located on opposite sides of its fulcrum and in operative relation with the actuator cams 66 and 67. The lower extremity of the lever 62 engages a valve plunger 52 by means of a pin 63 provided thereon and the plunger is reciprocated to alternately open and close a port 53 in the valve casing and thereby control the flow of fluid through the communicating conduits 35, 46, 47 and 57 in a desired manner. The specific results produced by the fluid distributed through these conduits, as applied to a glass feeding apparatus, are set forth in my original application, of which the present application is a division.

Figure 2:
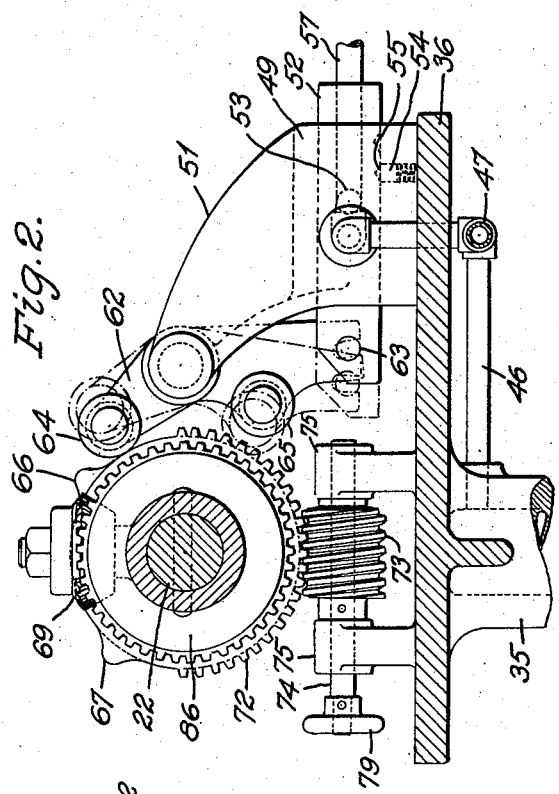
Fig. 2 is a detail view, with parts in section on the line 2—2 of Fig. 1.
Figure 4:
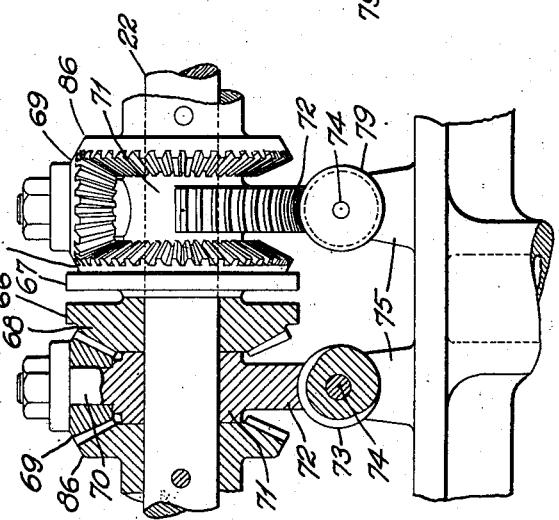
Fig. 4 is a front elevation, partially in section, of parts shown in Fig. 2.

From the above construction it is obvious that the cam 66 acts through the roll 64 to rock the lever 62 into the dotted-line position shown in Fig. 2, thereby opening the valve, and that the cam 67, acting through the roll 65, rocks the lever 62 in the opposite direction to close the valve. The valve plunger is yieldingly held in open or closed position by a spring-pressed detent 54 which engages one or the other of two notches 55.

In the operation of the timer, the shaft support is rotated at a uniform speed, thus causing the cams carried thereby to revolve in unison and since a similar individual drive is provided for each cam, all the cams are obliged to rotate at the same speed and in the same direction. Should it be desired to advance or retard the time at which a particular cam in the series performs its function, the angular position of the cam may be changed relative to the revolving support by turning the hand wheel associated with that cam.

It is a principal feature of the present invention that a series of fluid-pressure valves are opened and closed by a series of cams, each cam being independently driven and capable of being adjusted independently of every other cam in the series, without stopping the rotation of the other timer cams. This individual adjustment feature is of special importance in controlling the sequence of operations in glass feeding apparatus, and it enables the operator to control the action of the feeder with much greater accuracy than is possible with timing devices which must be stopped before adjustments are made, or with timing devices which do not have the independent adjustments which characterize my present invention.

While my invention is of special value in operating glass feeding machines and their associated mechanisms, it may also be applied to the actuation and control of various other mechanisms. Also, the structural details which are shown and described herein may be modified in many respects without departing from my invention, as set forth in the appended claims.

I claim as my invention:

1. In a timing device for a glass feeder or the like, the combination of a plurality of slide valves for transmitting fluid pressure controlling the operations of the feeder or other mechanism to be controlled, and means for operating said valves at adjustable times comprising pivoted rockers each connected to reciprocate the slide of one of said slide valves, and each having two projections rocking in different planes, two rotary actuating disks for each of said valves, one to open the valve and one to close it, all of the said disks being mounted for rotation upon a common axis and each disk being provided with an actuating member for engaging one of said rocker projections and for thereby moving its associated rocker and the valve slide associated therewith, each of said disks being independently adjustable angularly about the said axis of rotation, while said disks are rotating, for independently changing the time when any of said valves is opened or the time when any of said valves is closed.

2. In a timing device for a glass feeder or the like, the combination of a slide valve, a pivoted rocker connected to reciprocate the slide of said valve and having two projections rocking in different planes, two rotary actuating members revolving about a common axis and located in different planes, each of the said actuating members being adapted to engage one of said rocker projections, and each of said actuating members being independently adjustable angularly relative to the other about the said axis of rotation for independently changing either the time when said valve opens or the time when said valve closes.

3. In a timing device for a glass feeder or the like, the combination of a control valve having a valve member movable alternately to open and closed position, a pivotally movable rocker connected to move said valve member and having two projections rocking in different planes, and two rotary actuating members revolving about a common axis and located in different planes, each of the said actuating members being adapted to engage and move one of said rocker projections, both of said actuating members being angularly adjustable with respect to each other to change independently the time at which either of said actuating members engages and moves said rocker and to thereby independently change either the time when said valve opens or the time when said valve closes.

4. In a timing device for a glass feeder or the like, the combination of a slide valve, a pivoted rocker connected to reciprocate the slide of said valve and having two projections rocking in different planes, two rotary actuating members revolving about a common axis and located in different planes, each of the said actuating members being adapted to engage one of said rocker projections, and one of said actuating members being adjustable angularly relative to the other about the said axis of rotation for changing the relative times when said actuating members engage and move said rocker.

5. In a timing device for a glass feeder or the like, the combination of a slide valve, a pivoted rocker connected to reciprocate the slide of said valve and having two projections rocking in different planes, and two actuating members movable in different planes and each adapted to engage one of said projections and to thereby move said rocker and said slide valve, both of said actuating members being relatively adjustable with respect to each other to change independently the time at which either of said actuating members engages and moves said rocker.

6. In a timing device for a glass feeder or the like, the combination of a slide valve, a pivoted rocker connected to reciprocate the slide of said valve and having two projections rocking in different planes, and two actuating members movable in different planes and each adapted to engage one of said projections and to thereby move said rocker and said slide valve, one of said actuating members being adjustable relative to the other to change the relative times at which the said actuating members engage and move said rocker.

7. In a timing device for a glass feeder or the like, the combination of a control valve having a valve member movable alternately to open and closed positions, a pivotally movable rocker connected to move said valve member and having two projections rocking in different planes, and two rotary actuating members revolving about a common axis and located in different planes, each of the said actuating members being adapted to engage and move one of said rocker projections, and one of said actuating members being angularly adjustable relative to the other to change the relative times at which the said actuating members engage and move said rocker.

8. In a timing device for a glass feeder or the like, the combination of a control valve having a valve member movable alternately to open and closed positions, a pivotally movable rocker connected to move said valve member and having two projections rocking in different planes, and two actuating members each movable to engage one of the said rocker projections and cooperating to oscillate said rocker, both of said actuating members being relatively adjustable with respect to each other to change independently the time at which either of said actuating members engages and moves said rocker.

9. In a timing device for a glass feeder or the like, the combination of a control valve having an oscillable valve member movable alternately to open and closed positions, a pivotally movable rocker connected to move said valve member and having two projections rocking in different planes, and two actuating members each movable to engage one of the said rocker projections and cooperating to oscillate said rocker, one of said actuating members being adjustable relative to the other to change the relative times at which the said actuating members engage and move said rocker.

10. In a timing device for a glass feeder or the like, the combination of a control valve having a valve member movable alternately to open and closed positions, a pivotally movable rocker connected to move said valve member and having two projections rocking in different planes, and two actuating members each movable to engage one of the said rocker projections and cooperating to oscillate said rocker, one of said actuating members being adjustable relative to the other to change the relative times at which the said actuating members engage and move said rocker.

11. In a timing device for a glass feeder or the like, the combination with a source of fluid pressure and a valve for transmitting said fluid pressure to said feeder, of a plurality of actuating means operating in different planes, one of said actuating means being adapted to open said valve, and the other being adapted to close said valve, and means for shifting the time of operation of either of the said actuating means independently of the time of actuation of the other actuating means to shift the time of occurrence of the opening or closing of the said valve independently of each other.

12. In a timing device for a glass feeder or the like, the combination with a source of fluid pressure and a valve for transmitting said fluid pressure to said feeder, of a two-armed lever associated with said valve and connected to open said valve when moved in one direction and to close said valve when moved in the opposite direction, the arms of said lever being offset from each other, and two rotatable disks carrying actuating members for moving said lever to open and close said valve, the relative angular positions of said disks being variable while the disks are rotating.

13. In a timing device for a glass feeder or the like, the combination with a source of fluid pressure and a plurality of valves for transmitting said fluid pressure to said feeder, of means for operating the said valves at adjustable times, comprising two-armed levers, each associated with one of said valves and connected to open its valve when moved in one direction, and to close said valve when moved in the opposite direction, the arms of said levers being offset from each other, and a series of aligned disks arranged in pairs, one pair for each of said valves, the said disks carrying actuating members adapted to engage the said levers to alternately open and close each of said valves, and the angular positions of all of said disks being manually variable while the said disks are rotating, to change either the relative angular positions of any one pair of said disks, or to change the relative positions of one pair of disks with respect to any other pair of said disks.

14. In a timing device for a glass feeder or the like, the combination with a source of fluid pressure and a valve for transmitting said fluid pressure to said feeder, of a plurality of actuating means operating in different planes and moving in the same direction, one of said actuating means being adapted to open said valve, and another being adapted to close said valve, and means for shifting the time of operation of either of the said actuating means independently of the time of operation of the other actuating means, to shift the time of occurrence of the opening or closing of the said valve independently of each other.

15. In a timing device for a glass feeder or the like, the combination with a source of fluid pressure and a valve for transmitting said fluid pressure to said feeder, of a rotary actuating member for opening said valve, another rotary actuating member for closing said valve, and means, operable while said actuating members are rotating, for changing the angular positions of either or both of said actuating members independently of each other.

16. In a timing device for a glass feeder or the like, the combination with a source of fluid pressure and a valve for transmitting said fluid pressure to said feeder, of a rotary actuating member for opening said valve, another rotary actuating member for closing said valve, and gearing, manually operable while said actuators are rotating, for changing the angular position of either of said actuating members independently of the other.

17. In a timing device for a glass feeder or the like, the combination with a source of fluid pressure and a valve for transmitting said fluid pressure to said feeder, of means for operating said valve, comprising a pair of aligned rotatable disks, one of said disks carrying an actuating member for opening said valve, and the other disk carrying an actuating member for closing said valve, and means, operable manually while the said disks are rotating, for angularly adjusting each of said disks independently of the other disk.

18. In a timing device for a glass feeder or the like, the combination with a source of fluid pressure, of a control valve having a valve member movable back and forth between open and closed positions, a rotary actuating member for opening said valve, another rotary actuating member for closing said valve, both of the said rotary actuating members being rotatable in the same direction and upon the same axis, and gearing, manually operable while said actuating members are rotating, for changing the angular position of either of said actuating members independently of the other.

19. In a timing device for a glass feeder or the like, the combination, with a series of valves for controlling fluid pressure, of a plurality of rotary members for actuating said valves in variable timed relation, all of said valve-actuating members being rotatable on a common axis, and gearing, manually operable while said valve-actuating members are rotating, for individually changing the angular position of any of said actuating members and for thereby changing the time at which the angularly adjusted member actuates its valve.

Signed at Hartford, Conn., this 29th day of December, 1925.

KARL E. PEILER.